UNITED STATES PATENT OFFICE.

THOMAS W. NICHOLS, OF CHICAGO, ILLINOIS.

COMPOSITION OF MATTER FOR MAKING SOFT SOAP.

964,538.

Specification of Letters Patent. Patented July 19, 1910.

No Drawing. Application filed March 31, 1910. Serial No. 552,522.

*To all whom it may concern:*

Be it known that I, THOMAS W. NICHOLS, a citizen of the United States, residing at Chicago, in the county of Cook and State of Illinois, have invented certain new and useful Improvements in Compositions of Matter for Making Soft Soap, of which the following is a specification.

My invention relates to a new and useful composition of matter for making soft soap.

The composition consists of the following ingredients, to be mixed in the manner to be hereinafter described, and in the proportions stated, viz: linseed oil 12 pounds, potassium hydroxid 5 pounds, alcohol 3 pints, spermaceti 2 pounds, phenol 1 pound, rice flour 2 pounds, acetone 1 pound, glycerin 3 pounds, oil of lavender flowers 1 ounce, zinc stearate 1 pound, soap bark (quillaja) 2 pounds, water 5 gallons, tincture of cudbear ½ ounce.

In compounding, or mixing, the above ingredients, I first heat the linseed oil in a suitable vessel to the proper degree of temperature, and then add about four pounds of the solution of potassium hydroxid, which has been previously warmed, and about two pints of the alcohol. The heating of the above mixture is then continued until the same has reached about 212 degrees Fahrenheit. Next I add the spermaceti which has been previously dissolved in the remaining 1 pint of the alcohol and saponified by the addition of the remaining 1 pound of the potassium hydroxid solution. These conditions cause the saponification of linseed oil and spermaceti. The phenol, rice flour, acetone, glycerin, oil of lavender flowers, and zinc stearate are next mixed, by agitation, and are added to the foregoing mixture of linseed oil, potassium hydroxid, alcohol, and spermaceti, which has been allowed to slightly cool. Next is added an aqueous solution made by macerating the soap bark (quillaja) with a sufficient amount of hot water, and lastly is added the tincture of cudbear. The mixture is then stirred thoroughly and set aside to cool.

The resulting product will be a beautiful transparent semi-solid soap, extremely saponaceous and mild, owing to the soap bark and glycerin, and owing to the ingredients contained therein, especially the zinc stearate, will possess wonderful healing and antiseptic properties, suitable for toilet, mechanical, or surgical use.

Having thus fully described my invention, what I claim is—

The herein described composition of matter for making soft soap, consisting of linseed oil, potassium hydroxid, alcohol, spermaceti, phenol, rice flour, acetone, glycerin, oil of lavender flowers, zinc stearate, soap bark (quillaja), water, and tincture of cudbear, mixed in the proportions and substantially in the manner described.

In testimony whereof I affix my signature in presence of two witnesses.

THOMAS W. NICHOLS.

Witnesses:
GRACE WATTS,
ARTHUR WESLEY.